April 29, 1952     W. BAUMANN     2,594,845
TWO-STROKE CYCLE INTERNAL-COMBUSTION ENGINE
Filed March 22, 1946     4 Sheets-Sheet 1
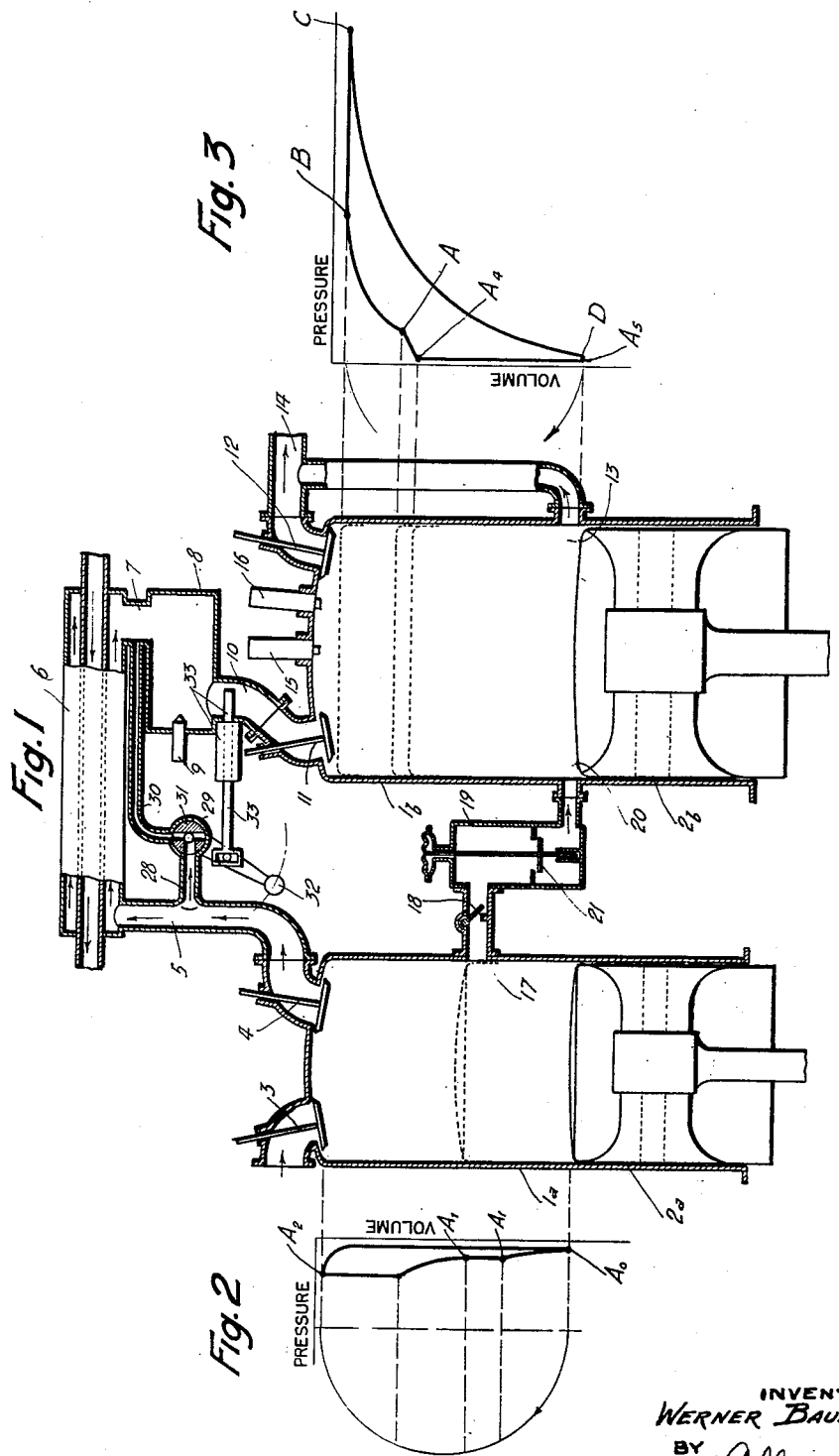
INVENTOR.
WERNER BAUMANN.
BY *Allen & Allen*
ATTORNEYS.

April 29, 1952 W. BAUMANN 2,594,845
TWO-STROKE CYCLE INTERNAL-COMBUSTION ENGINE
Filed March 22, 1946 4 Sheets-Sheet 2
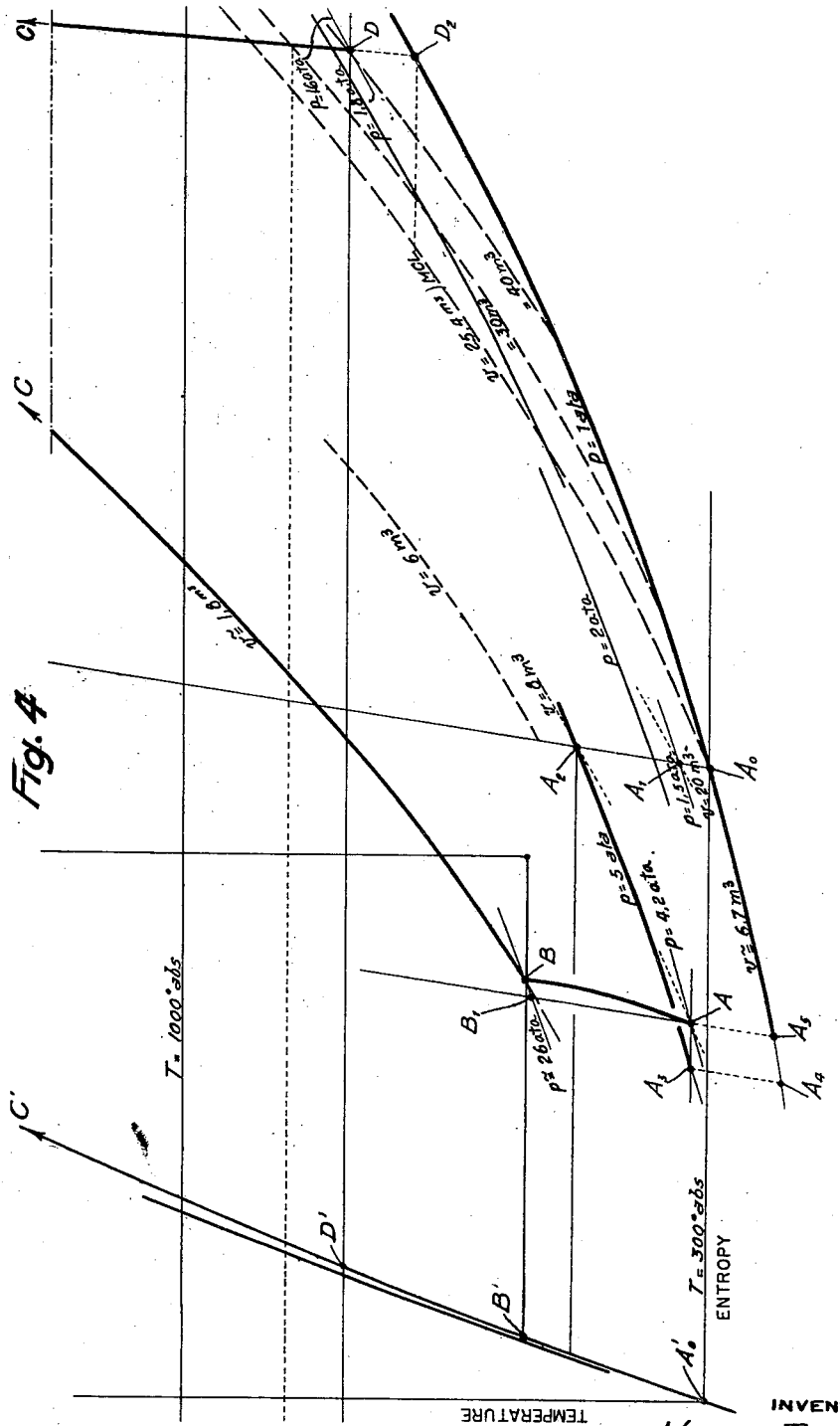
INVENTOR.
WERNER BAUMANN.
BY
ATTORNEYS.

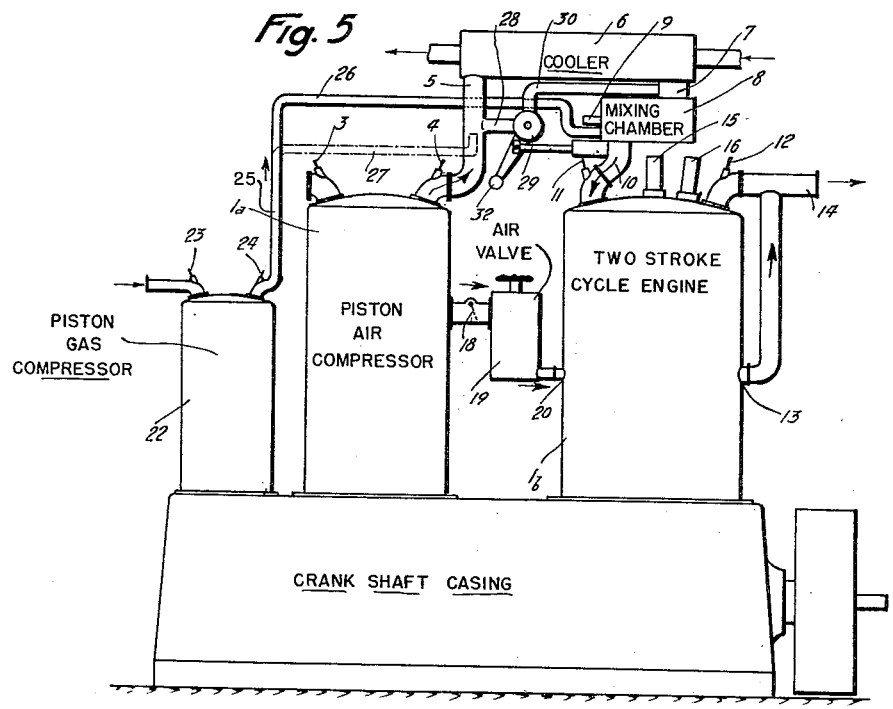

April 29, 1952 W. BAUMANN 2,594,845
TWO-STROKE CYCLE INTERNAL-COMBUSTION ENGINE
Filed March 22, 1946 4 Sheets-Sheet 4
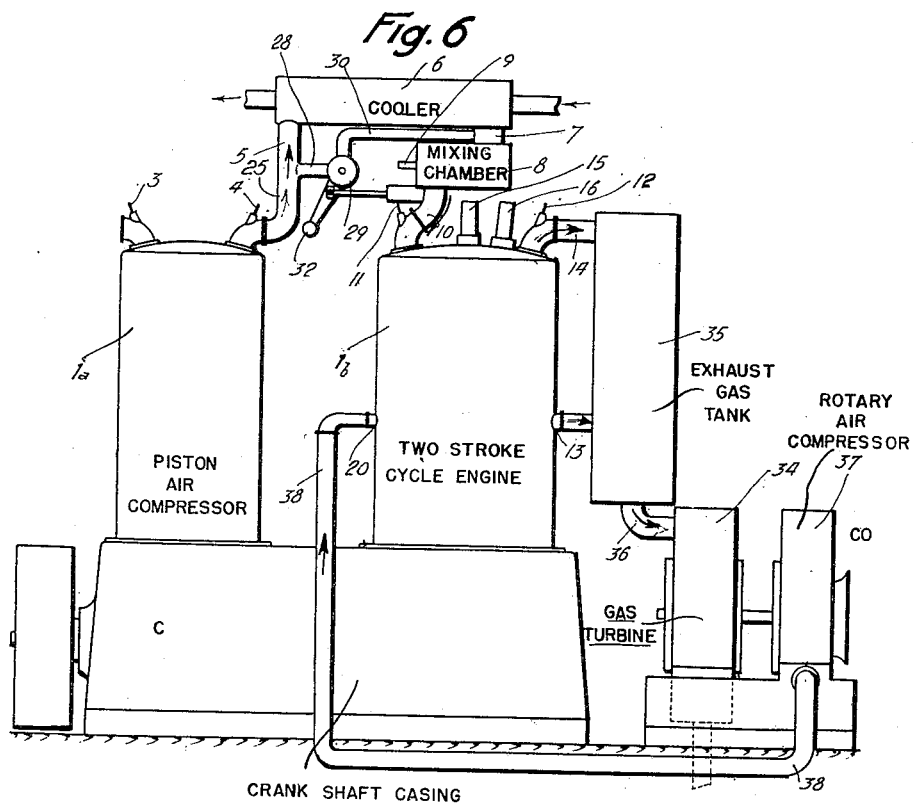
INVENTOR.
WERNER BAUMANN.
BY Allen & Allen
ATTORNEYS.

Patented Apr. 29, 1952

2,594,845

UNITED STATES PATENT OFFICE 2,594,845

TWO-STROKE CYCLE INTERNAL-COMBUSTION ENGINE

Werner Baumann, Paris, France

Application March 22, 1946, Serial No. 656,376
In France June 4, 1945

5 Claims. (Cl. 60—13)

In internal combustion engines the maximum transformation of the heat into power available on the shaft is limited by the fact that the expansion volume of the engine is equal to the initial compression volume in the cylinder; it has been attempted to increase the expansion volume by mechanical means but it was not possible substantially to increase the efficiency. The highest overall efficiency which is known for the present time is that of a diesel engine built by Sulzer Frères i. e. 42%. That of the explosion engine remains about ten points lower.

The present invention has for its object to provide an operating cycle capable of yielding a total efficiency of 52 to 58% and even more, without using the exhaust heat. It is a two-stroke cycle the first stroke of which is distinctly divided in two periods. The invention also relates to engines comprising the application of said cycle.

According to the invention, the combustion air is compressed by a compressor outside the working cylinder up to a pressure of about 2 to 6 absolute atmospheres and cooled down to a value near the surrounding temperature as it is done for gas engines. It is then that a determining characteristic intervenes: While, in a two-stroke engine, with overfeed or for potential gas, the new charge enters the cylinder at the lower dead center while itself expelling the burnt gases, often against a high back pressure, in the engine according to the invention it is introduced into the cylinder, which has been previously scavenged without the help of the charge—only when the piston of the engine has already performed ⅔ to ⅘ of its upwards stroke. It is at this moment that the exhaust valve closes while the admission valve opens, during a small fraction of the stroke, just enough for the charge to fill the remainder of the cylinder volume under a pressure slightly lower than the admission pressure, or at the utmost equal to the latter. After the closure of the admission valve the final compression is effected by the working piston up to the desired temperature and pressure selected by the maker according to the fuel which is used. It is thus possible at will to determine the introduction volume of the charge and to fix it at any ratio to the expansion volume.

The second stroke of the cycle—combustion and expansion—does not differ from that of an ordinary engine. The exhaust takes place approximately at the end of the downward stroke and it may take place through conventional ports located near the lower dead center. The expulsion of the burnt gases occurs without any substantial back-pressure as in an ordinary engine and with the following arrangement: A quantity of scavenging air, the volume of which is slightly greater than that of the remaining cylinder volume after the closure of the exhaust valve, is introduced through ports located at the lower dead center so as to fill, in the lower part, only ⅓ to ½ of the cylinder, so that the piston in its upward stroke first expels the burnt gases and at the moment when the exhaust valve closes, only air is in the cylinder. Contrary to other systems the charge proper and the scavenging air here enter the working cylinder separately and in two distinctly separated periods of time, a feature unknown in the present two-stroke cycle engine; it is thus possible in the two-stroke cycle according to the invention to carburize the charge, or make the mixture in the case of a gas engine, before the introduction but, of course, after the cooling, without any loss through scavenging.

The ignition pressure is higher for the same ignition temperature because of the preliminary cooling. This increases the efficiency, which is still further enhanced by a higher expansion which gives rise to an exhaust temperature much lower than in the known two- and four-stroke cycle engines.

The scavenging air is taken from the compressor or the turbo-compressor when the pressure in said compressor is from 300 to 400 grams per square centimeter. In the case of a low powered engine, with a piston compressor, one may work in the following manner: The compressor cylinder is provided with an exhaust port located at that point where, according to the PV-diagram, the pressure is from 200 to 400 grams and the quantity of scavenging air can be expelled, so that the piston itself controls it; there is an advantage in arranging a non-return valve beyond this port to prevent a return during the suction period. The turbo-compressor will make it possible to effect the supply of air without any valve after the first or second stage.

The appended drawing shows diagrammatically the application of the cycle which forms the subject matter of the present invention to a single-cylinder engine with a piston compressor on the same shaft as the working cylinder.

In said drawing:

Fig. 1 is a diametral sectional view showing the engine through the axis of its compressor and its working cylinder;

Fig. 2 shows the PV-graph of the compressor;

Fig. 3 shows the PV-graph of the working cylinder;

Fig. 4 shows the entropy-graph according to Stodola for the operation of the engine for a numerical example;

Fig. 5 is a diagrammatical elevational view of a gas engine according to the invention;

Fig. 6 is a similar view showing an engine with an exhaust gas turbine driving a turbo-compressor for the scavenging air.

In the three graphs (Figs. 2, 3 and 4) the letters refer to the cardinal points of the diagrams and the numbers refer to the constructional diagram of Fig. 1.

$1a$ and $2a$, $1b$ and $2b$ are respectively the cylinder and the piston of the compressor and of the engine. Air is introduced through the valve 3 and the compressed air is delivered through the valve 4 into the piping 5 which leads it to the cooler. The cooled air passes through the pipe branch 7 to the carburetting or spraying or mixing chamber 8 (in the case of a gas engine). 9 is a spraying nozzle or an atomizer. The carburized charge passes through the piping 10 to the inlet valve 11. 12 is the exhaust valve and 14 the discharge piping. The exhaust can also take place optionally through the port 13. Spark plugs are diagrammatically indicated at 15 and 16, for the case of an engine other than a diesel.

The scavenging air from the cylinder $1a$ passes through the port 17 and the valve 18 to the reservoir 19 which discharges it into the scavenging port 20.

Thus, in the case of a gas engine, with two cylinders or turbo-compressors a delivery of scavenging air takes place only on the air compression step.

One immediately sees how the point $A_1$ of Fig. 2 of the compressor graph determines the location of the port 17 which is the final point for expelling the scavenging air. The part is thereafter covered by the piston.

The PV-graph of the working cylinder in Fig. 3 shows from $A_5$ to $A_4$ the period of partial scavenging at a very low pressure. At $A_4$ the valve 12 closes and the valve 11 opens and the pressure rises rapidly from point A where the valve 11 closes and where the final compression A—B begins. Towards B the oil is injected or the mixture is ignited; the combustion causes the pressure to rise to point C and then the expansion C—D takes place. At D the exhaust valve 12 opens and port 13 is uncovered. One may see that the designer is free to choose the location of point $A_4$ with respect to the volume at $A_5$ and that the final compression of the compressor is independent of the pressure in the cylinder from $A_5$ to $A_4$, whereby the cycle according to invention differs from the known cycles. This feature forms the basis of the very high efficiency which the cycle yields.

The cycle can be followed in Fig. 4 which shows the entropygraph. For simplicity's sake it has been shown in accordance with the working of a single-cylinder engine. The compressor takes in at $A_0$ 1 molecule-kilogram of air for the charge and ½ molecule-kilogram of air for scavenging at 1 absolute atmosphere. At $A_1$, at 1.5 absolute atmospheres, it expels the scavenging air and compresses the charge to 5 absolute atmospheres till point $A_2$ where it is expelled in its turn towards the cooler which brings its temperature down to 325° F. at which temperature the carburization occurs at $A_3$. The charge then enters the cylinder and expands first to point $A_4$ then rapidly is compressed to A on the line $p=4.2$ absolute atmospheres and the temperature near that of point $A_3$. The working-graph begins at A by the final compression from A to B. One sees that the graph is strongly off-set to the left with respect to that of an ordinary engine, as in engines with supercharge and cooling. If the ignition of the charge takes place at the usual temperature of the ordinary engine at 6 or 7 absolute atmospheres it has here a pressure of 26 atmospheres, which increases the combustion pressure but strongly reduces the final expansion temperature, whence the claimed high beneficial advantage.

At point A the molecule-kilogram of the charge has a volume of 6.7 cubic meters; at B the volume is 1.8 cubic meters and at D it is 30 or 40 or 45 cubic meters instead of 24.5 cubic meters at $A_1$.

The introduction of the visible gradation of the heat between B and C is determined by the air excess K; if K is, for example, chosen equal to 2.2 one finds after deduction of all mechanical losses a total final efficiency of 55 to 56% either with gasoline or with alcohol or even with gas oil, of course with a point B which is higher in temperature and in pressure.

The temperatures which the exhaust members have to bear are several hundred degrees lower than in usual engines.

In the description the gas engine has not been mentioned especially but the cycle is applicable to such an engine in the same way as to other engines with the only difference that there are two compressors, one for the gas and the other for the air. The efficiency remains at the same high values which makes it possible more generally to use gases with a low calorific power.

Such an engine is shown diagrammatically in Fig. 5 in which the working cylinder $1b$ can be seen with its inlet and exhaust valves 11 and 12 respectively, the auxiliary exhaust 13, the inlet piping 10, the chamber 8, the air cooler 6 with its pipings 7 and 5 as well as the air compressor $1a$ with its intake and delivery valves 3 and 4 respectively and the scavenging piping 18 leading to the scavenging port 20. The gas compressor cylinder is shown at 22 with its intake and delivery valves 23 and 24 respectively. A piping 25 brings the compressed gas either through the piping 26 to the chamber 8 or through the piping 27 to the piping 5. The pistons of the three cylinders $1b$, $1a$ and $2b$ are mounted on one and the same crank shaft.

A possibility has not yet been mentioned which proves the independence of the expansion volume of the cylinder volume with respect to the charge; the cylinder volume can also be smaller than 25 cubic meters for 1 molecule-kilogram; for this purpose the opening of the inlet valve of the charge is slightly advanced, which reduces the expansion volume of the molecule in the cylinder and the pressure is then higher in the turbine. This results in a proportional reduction of the efficiency. The designer will judge up to which point he can go in each application because even at a working volume of only 20 cubic meters per molecule the losses become high.

It is necessary that the compression step of the cycle always occur under the same conditions irrespective of the working regime. This requires a constant supply of air. The invention preferably provides for the insertion, for this purpose, on the piping or the reservoir 19 (Figure 1), of a flap valve, slide valve or ordinary valve 21 actuated by the pressure of the scavenging air and of the outer air in a manner well known per se, which acts so that the difference between the absolute pressures of the scavenging air and the outer air remains constant between the compressor and this controller, the adjustable spring of which will also make it possible to cause regime variations. The pressure and the duration of the scavenging should not interfere with the supplied quantity of air.

The invention also provides for the possibility of arranging a by-pass 28, 29, 30 in the compressed air piping 5 before the cooler 6, said by-pass being provided with a valve 31 actuated by hand at 32 or by means of a thermostat 33 so as to make it possible to mix the hot air with the cold air in order to be able to give a rather constant temperature before the admission valves.

The expansion from D to $D_2$ under outer air pressure can still be used in a turbine 34 (Fig. 6) which will also receive besides the burnt gases, through the reservoir 35 and the piping 36, the excess of the scavenging air heated without any expense by the cylinder and the piping, said exhaust turbine 34 actuating an air compressor 37, connected by the pipe 38 to the port 20. The gain amounts to about one hundred calories per molecule-kilogram and increases the efficiency so that it even remains practically constant between the powers 1.1 and 0.5 and considerably above 50% with a possible maximum of 56 to 58%.

What I claim is:

1. A two stroke cycle internal combustion engine comprising a cylinder having inlet and exhaust ports disposed at the upper part thereof, means for controlling the opening of said ports, a piston in said cylinder and means for actuating said controlling means in timed relation with the movement of said piston, said controlling means causing said exhaust port to close and said inlet port to open when said piston has covered at least two-thirds of its compression stroke, said control means also causing said inlet port to close shortly after it has opened and before said piston has covered four-fifths of its compression stroke, a source of cooled compressed air and a source of fluid fuel, means to connect the source of cooled compressed air with the said inlet port, a supplementary inlet port for scavenging air and a supplementary exhaust port for burnt gases and scavenging air, said supplementary ports being disposed in a combustion chamber near the lowermost position of the piston in said chamber and being opened and closed by said piston, and means for carburizing the fuel and causing it to be ignited.

2. A two stroke cycle internal combustion engine comprising a cylinder having an inlet and exhaust ports disposed at the upper part thereof, means for controlling the opening of said ports, a piston in said cylinder and means for actuating said controlling means in timed relation with the movement of said piston, said controlling means causing said exhaust port to close and said inlet port to open when said piston has covered at least two-thirds of its compression stroke, said control means also causing said inlet port to close shortly after it has opened and before said piston has covered four-fifths of its compression stroke, an air compressor provided for delivering air under pressure, said compressor comprising a cylinder and a piston, an air inlet port for said compressor, and means for controlling said air inlet port to open when said compressor piston is on its suction stroke and to close when said piston is on its compression stroke, an exhaust port for said compressor and means for controlling said exhaust port in timed relation to the movement of the piston of said internal combustion engine to open the same when the required pressure for forcing the combustion air into the engine has been reached and to close the same when the piston of the compressor has reached the end of its compression stroke, a supplementary inlet port for scavenging air and a supplementary exhaust port for burnt gases and scavenging air, said supplementary ports being arranged in the combustion chamber near the lowermost position of the piston in said chamber and being opened and closed by the said piston, the piston of said compressor being in advance with respect to the piston of said combustion engine so as to compress air to scavenging pressure when the supplementary inlet port for scavenging air opens, said supplementary inlet port being connected with the cylinder of said compressor, a source of cooled compressed air and a source of fluid fuel, means to connect the source of cooled compressed air with the said inlet port, and means for carburizing the fuel and causing it to be ignited.

3. An internal combustion engine according to claim 2 in which means are provided for maintaining constant the difference between the absolute pressure of the external air and the absolute pressure of the scavenging air.

4. A two stroke cycle internal combustion engine comprising a cylinder having inlet and exhaust ports disposed at the upper part thereof, means for controlling the opening of said ports, a piston in said cylinder and means for actuating said controlling means in timed relation with the movement of said piston, said controlling means causing said exhaust port to close and said inlet port to open when said piston has covered at least two-thirds of the compression stroke, said control means also causing said inlet port to close shortly after it has opened and before said piston has covered four-fifths of its compression stroke, a source of cooled compressed air and a source of fluid fuel, means to connect the source of cooled compressed air with the said inlet port, a supplementary inlet port for scavenging air and a supplementary exhaust port for burnt gases and scavenging air, said supplementary ports being arranged in the combustion chamber near the lowermost position of the piston in said chamber and being opened and closed by the said piston, an air compressor for delivering scavenging air, said air compressor being a turbo-air compressor, and means for carburizing the fuel and causing it to be ignited.

5. An internal combustion engine according to claim 4 in which said turbo-air compressor is actuated by a gas turbine driven by the exhaust gases of said internal combustion engine.

WERNER BAUMANN.

REFERENCES CITED

The following references are of record in the file of this patent:

UNITED STATES PATENTS

| Number | Name | Date |
| --- | --- | --- |
| 729,984 | Wallman | June 2, 1903 |
| 1,111,841 | Koenig | Sept. 29, 1914 |
| 1,127,642 | Koenig | Feb. 9, 1915 |
| 1,386,394 | Cage | Aug. 2, 1921 |
| 1,477,994 | Büchi | Dec. 18, 1923 |
| 1,600,795 | Cage | Sept. 21, 1926 |
| 2,292,233 | Lysholm | Aug. 4, 1942 |
| 2,403,398 | Reggio | July 2, 1946 |

FOREIGN PATENTS

| Number | Country | Date |
| --- | --- | --- |
| 570,533 | France | May 2, 1924 |
| 28,866 | Great Britain | Dec. 21, 1911 |
| 347,118 | Great Britain | Apr. 21, 1931 |
| 401,239 | Great Britain | Nov. 9, 1933 |